(12) United States Patent
Burton et al.

(10) Patent No.: US 8,977,192 B2
(45) Date of Patent: Mar. 10, 2015

(54) FAST DATA

(75) Inventors: Bruce J. Burton, Grosse Pointe Farms, MI (US); Ryan Johnson, Grand Haven, MI (US); Matthew Shinew, Grand Haven, MI (US); Warren Guthrie, West Olive, MI (US)

(73) Assignee: AvidaSports, LLC, Harper Woods, MI (US)

( * ) Notice: Subject to any disclaimer, the term of this patent is extended or adjusted under 35 U.S.C. 154(b) by 528 days.

(21) Appl. No.: 13/329,660

(22) Filed: Dec. 19, 2011

(65) Prior Publication Data

US 2012/0156991 A1 Jun. 21, 2012

Related U.S. Application Data

(60) Provisional application No. 61/424,431, filed on Dec. 17, 2010, provisional application No. 61/424,439, filed on Dec. 17, 2010.

(51) Int. Cl.
*A63B 71/00* (2006.01)
*H04L 29/08* (2006.01)

(52) U.S. Cl.
CPC .............. *H04L 67/12* (2013.01); *H04L 67/325* (2013.01); *A63B 2220/40* (2013.01); *A63B 2220/836* (2013.01); *A63B 2225/20* (2013.01); *A63B 2225/50* (2013.01); *A63B 2244/20* (2013.01)

USPC ............ 455/40; 482/8; 340/870.13; 370/433; 370/437; 370/442; 370/459

(58) Field of Classification Search
CPC H04L 67/12; H04L 67/325; A63B 2220/836; H04B 7/2656; H04B 7/212–7/2123; H04Q 11/04; H04W 72/0446; H04J 3/00
USPC ......... 370/280, 314, 294, 321, 326, 336, 345, 370/442, 458, 468, 498
See application file for complete search history.

(56) References Cited

U.S. PATENT DOCUMENTS

| 4,887,266 A | * | 12/1989 | Neve et al. ..................... 370/349 |
| 2009/0239710 A1 | * | 9/2009 | Shemesh et al. .................. 482/8 |
| 2010/0210975 A1 | | 8/2010 | Anthony, III et al. |

* cited by examiner

*Primary Examiner* — Gennadiy Tsvey
(74) *Attorney, Agent, or Firm* — Great Lakes Intellectual Property, PLLC.

(57) ABSTRACT

A fast data method is contemplated to speed data processing and/or transmission times associated with sensor devices desiring to report or otherwise communicate electronic data over wireless or wireline communications mediums to a processing entity. The fast data method may be achieved by scheduling transmission windows/intervals for the sensor devices and adjusting the scheduled intervals in a manner aimed at increasing processing/polling speeds and/or in a manner aimed at facilitating transmission of data built-up over time due to a prior inability to transmit the data.

20 Claims, 5 Drawing Sheets

FAST DATA

CROSS-REFERENCE TO RELATED APPLICATIONS

This application claims the benefit of U.S. provisional Application Nos. 61/424,431 and 61/424,439, both filed Dec. 17, 2010, the disclosures of which are incorporated in their entirety by reference herein.

TECHNICAL FIELD

The present invention relates to facilitating data transmissions, such as but not limited to adjusting transmission intervals in order to facilitate fast data transmission of wireless and/or wireline signaling.

BACKGROUND

United States patent application no. 2011/0153042, the disclosure of which is hereby incorporated in its entirety by reference herein, relates to a performance metric system where movements of a monitored person or device is tracked for use in computing performance results and metrics. The performance metric system relies upon wireless communications between a plurality of monitoring sensors (head and/or limb sensors) and a processing entity (e.g., a master station controller and/or a master station). It may be beneficial for this type of system, and other systems that rely upon signal transmission between multiple devices, to be able to facilitate fast data communications between the monitoring devices and the processing entity. The ability to facilitate fast data communications may be particularly relevant if the system desires to support real-time communications between the processing entity and the users wearing the monitoring sensor.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
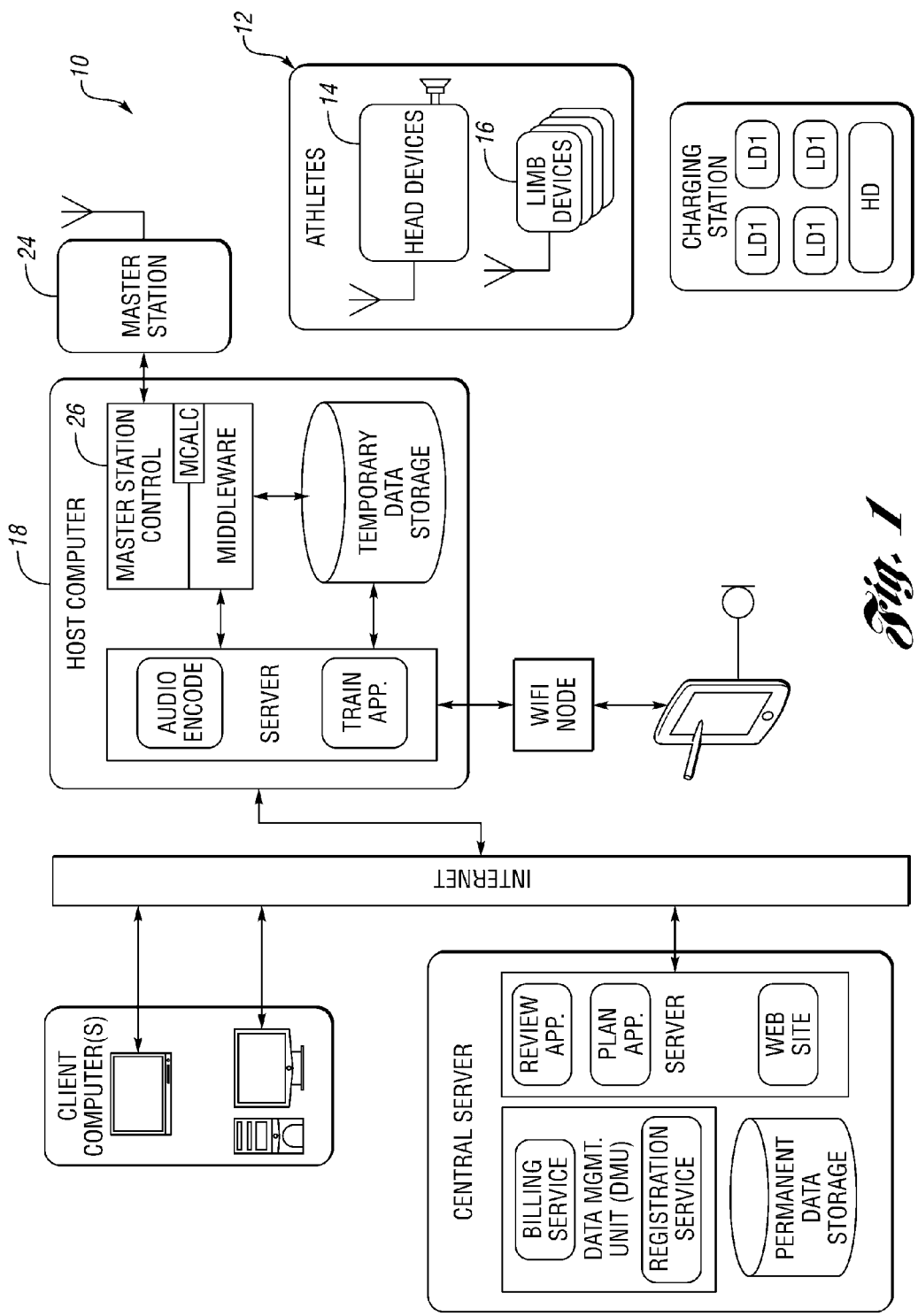
FIG. 1 illustrates a performance metric system as contemplated by one non-limiting aspect of the present invention.

FIG. 1 illustrates a performance metric system 10 as contemplated by one non-limiting aspect of the present invention. The system 10 is configured to facilitate tracking movements of athletes, users, persons, animals, and/or movable devices with a plurality of sensors 12, which are shown for exemplary purposes as being head and limb devices 14, 16 configured to attach to a head and limb of a user. The devices 14, 16 may be configured with accelerometers, gyroscopes, or other features sufficient to facilitate tracking movement, performance, and athletic endeavors of the wearer. The data collected by the devices 14, 16 may be referred to periodically herein as performance-metric data as the present invention is predominately described with respect to collecting the performance-metric data in order to generate performance results for athletes engaged in an athletic activity. This is done, however, for exemplary non-limiting purposes as the present invention fully contemplates use of the devices 14, 16 to collect facilitate processing of athletic and/or non-athletic data.

The sensors 12 may be configured to report the collected performance-metric data to a host computer 18 for further processing into performance results, such as in a manner described within United States patent application no. 2011/0153042. A master station 24 may be included to facilitate wireless communications necessary to facilitate wireless transmission of the performance-metric data to the host computer 18. The host computer 18 may include a master station controller 26 or other sufficient logically executing element to facilitate the desired communication of the performance-metric data. While a single master station 24 is shown for exemplary purposes, multiple master stations 24 may be included to facilitate multiple channel communications with the sensors 12, particularly if a plurality of sensors 12 are used to track a plurality of users. One master station 24, for example, may be assigned for each of a limb device 16 and a head device 14 such that communications with each device 14, 16 is carried out over a separate communication channel, i.e., a first channel for a left wrist device, a second channel for a right wrist device, a third channel for a left ankle device, a fourth channel for a right ankle device, and a fifth channel for a head device.

The master station controller 26 may be configured to facilitate controlling scheduling and other transmission related operations of the master station 24 associated with facilitating reporting of the performance-metric data. The master station controller 26 is shown to be a separate or standalone entity from the master station 24 for exemplary non-limiting purposes. The present invention fully contemplates the master station 24 being included as part of the master station controller 26 and/or another portion of the host computer 18 such that the present invention is not necessarily limited to the master station controller 26 and/or the master station 24 being independent or discrete elements. The master station 24 is illustrated as being feature separate from the master station controller 26 as one non-limiting aspect of the present invention contemplates the master station controller 26 being a more expensive device than the master station 24, such as a device having greater computational capabilities and/or requiring more programming and software to facilitate presentation of the performance results and other interactive capabilities facilitated with the performance metric system 10, e.g., facilitating reporting of the performance results to a central server, tablet computer, or other client devices/computers over the Internet or through a Wi-Fi node.

The master station 24 may be less expensive than the master station controller 26 in the event it is configured with less processing or operating capabilities and/or less capabilities of being re-programmed. The master station 24 may be a plug-in-play type of device which may be easily connected to the host computer 18 to facilitate scalability, such as to facilitate adding additional channel transmission capabilities to environments where more communications are required to support transmissions of greater numbers of sensors 12. The master station controller 26 may include greater computational capabilities than the master station 24 and may be tasked with managing communications carried out over the various communication channels associated with each master station 24. The master station controller 26 may be configured to generate a schedule or other set of instructions to facilitate controlling transmission intervals and other transmission related parameters used to govern or otherwise direct the processes by which the sensors 12 (e.g., head and limb devices 14, 16) are enabled to transmit the performance-metric data for further processing by the master station controller 26.

One non-limiting aspect of the present invention is particularly directed towards coping with an amount of time needed to report the performance-metric data to the master station controller 26. It is believed that having the master station 24 separate from the master station controller 26 may facilitate fast data transmissions of the performance-metric data by allowing the master station 24 to make certain decisions or otherwise independently direct sensor communications without having to expend additional time communicating with the master station controller 26, i.e., without wasting time getting approval of the master station controller 26 prior to adjusting the transmission scheduling each time. This capability may be beneficial in an arrangement where the master station 24 is schedule by the master station controller 26 to instruct the various sensor devices to transmit the performance metric data in a circular or round-robin configuration where each device is given an opportunity to transmit performance-metric data in a sequential manner whereby each device is given an opportunity transmit data before the same device is given a new opportunity to transmit data again.

Figure 2:
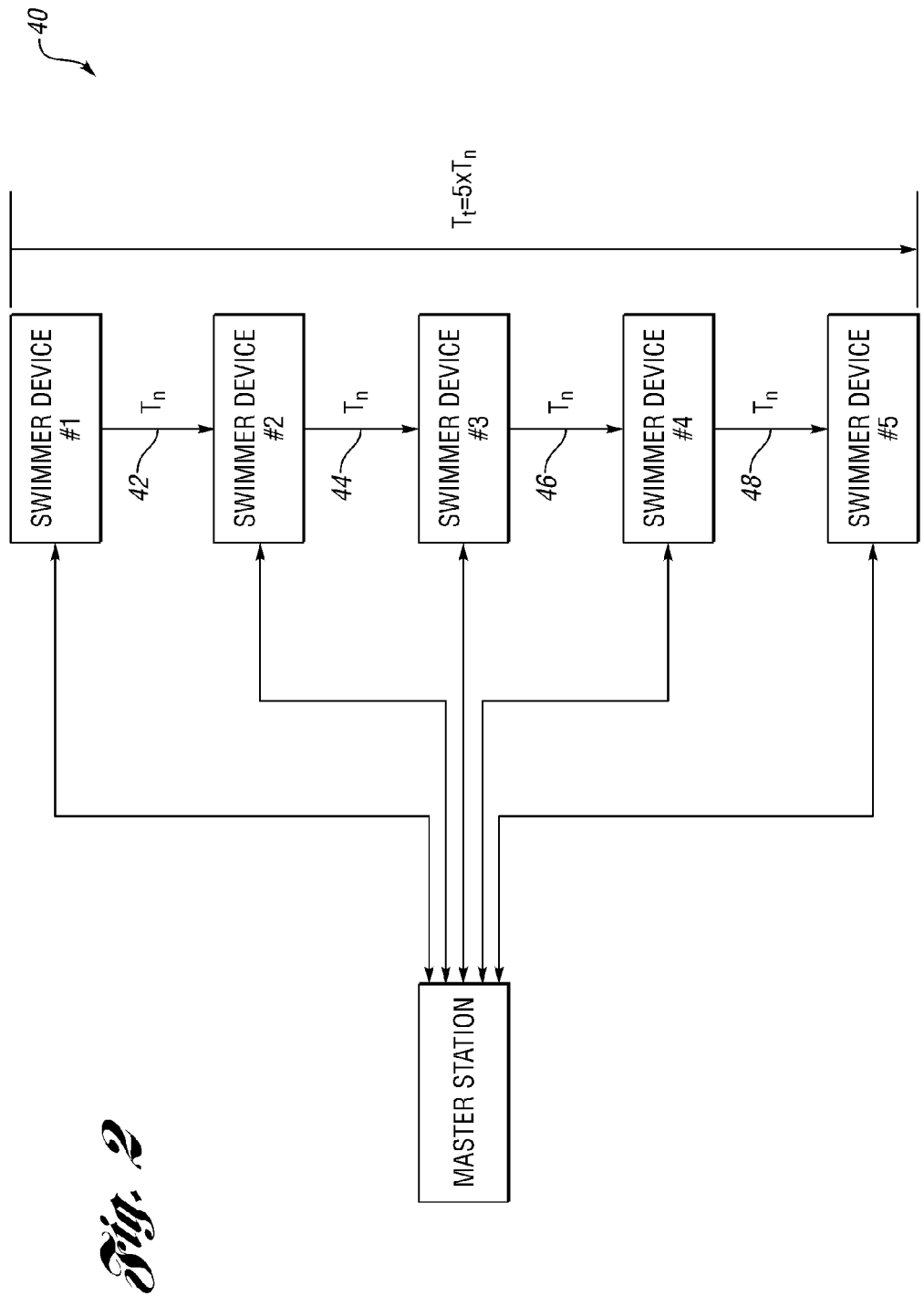
FIG. 2 illustrates a polling schedule as contemplated by one non-limiting aspect of the present invention.

FIG. 2 illustrates a schedule 40 generated by the master station controller 26 for directing the master station 24 to poll the sensor devices 12 for performance metric data in accordance with one non-limiting aspect of the present invention. FIG. 2 illustrates a scenario where the sensor devices are configured to be worn on the body of a swimmer. This exemplary illustration assumes it is desirable for each related swimmer device to communicate performance metric data over the same channel but undesirable for more than one of the swimmer devices to be transmitting performance-metric data to the master station 24 over the same channel at the same time. As noted above, the present invention is not necessarily limited to this exemplary configuration and fully contemplates multiple master stations 24 may be included within the performance-metric system to facilitate multiple channel transmission between the master station 24 and similarly configured swimmer devices 12. The schedule 40 may operate in a circular fashion whereby swimmer device #1, is polled prior to swimmer device #2, which is polled prior to swimmer device #3, which is polled prior to swimmer device #4, which is polled prior to swimmer device #5, and where the same order repeats of polling swimmer device #5, etc.

The schedule 40 may specify a transmission interval or window 42, 44, 46, 48 during which each of the swimmer devices is provided an opportunity to transmit performance-metric data or other data to the master station 24, which may then act on the transmitted data and/or relay the data to the master station controller 26 for further processing. The schedule 40 may specify a nominal length of time for each of the transmission windows ($T_n$). The nominal length of time may be dependent on the likely amount of data requiring transmission from the swimmer devices and the transmission speed etc. capabilities of the swimmer devices 12 and/or master station 24, and other variables associated with facilitating communications to complete the transmissions (e.g., the capabilities of the wireless and/or wireline communication mediums). The schedule 40 is shown for exemplary purposes as assigning, at least initially, each of the swimmer devices with the same nominal length of time ($T_n$), however, the present invention fully contemplates assigning different, initial length of time to the transmission windows of one or more of the swimmer devices.

With this scheduling, each of the swimmer devices, at least initially, are given an equal amount of time to transmit data to the master station 24. Optionally, the swimmer devices may be configured to await instructions from the master station 24 before transmitting the performance-metric data. This process may be beneficial over a process of pre-programming or otherwise relying on the swimmer devices to each individually determine the period during which they are to transmit data to the master station. The schedule 40 may repeat after a total length of time ($T_t$) taken to provide each of the swimmer devices with an opportunity transmit data. This repeating schedule may be beneficial in facilitating continuous transmission of performance-metric data the master station 24 and master station controller 26 as the swimmer continues to swim through the swimming pool and/or other movements of the user are taking place. While the master station 24 is shown to sequentially polls each of the swimmer devices in order, the repeating sequence may be varied with each repetition through the schedule, however, it may be beneficial to allow each swimmer device an opportunity to transmit data before allowing the same swimmer device to transmit data for a second time.

This equal-opportunity-type polling through each of the swimmer devices may be beneficial in facilitating fast data collection of the performance-metric data whereby the data can be continuously processed with the master station controller 26 to improve feedback. The master station controller 26, for example, may continuously process the influx of performance-metric data to generate real-time performance results, which may be communicated back to the swimmer to improve performance by providing feedback to the swimmer as the swimmer practices. While the fast data processing contemplated by the present invention may be useful in a number of environments, it is believed that the fast data capabilities may be particularly beneficial in any real-time environment where quick feedback of the data collected by the sensor devices is desirable. It is also believed that programming a master station 24 with the schedule may be more beneficial than relying on the master station controller 26 to identify each of the transmission windows to the master station 24 as it will eliminate the need for associated signaling between the master station 24 and master station controller 26. The present invention, however, fully contemplates the master station controller 26 executing similar operations without assistance from and/or in cooperation with the master station 24.

The process of instructing the swimmer devices of their opportunity to transmit data may include the master station 24 transmitting a corresponding instruction to the swimmer device. The swimmer device may then be required to process the instruction and provide a response. The master station 24 may be programmed by the master station controller 26 or otherwise with a job list or other listing sufficient to organize the order in which the swimmer devices are to be invited to communicate the performance-metric data. The length of time taken to poll through all the swimmer devices (Tt) may be greatly influenced by the amount of time taken to communicate the data request instruction to the swimmer device and to wait for the swimmer devices to respond. In the event a high number of swimmer devices are being polled, every millisecond of time savings can be beneficial in speeding the rate at which data can be collected from each of the swimmer devices, i.e., more data can be processing collected to provide improved real-time performance by ameliorating the time spent waiting for the swimmer devices to respond.

Figure 3:
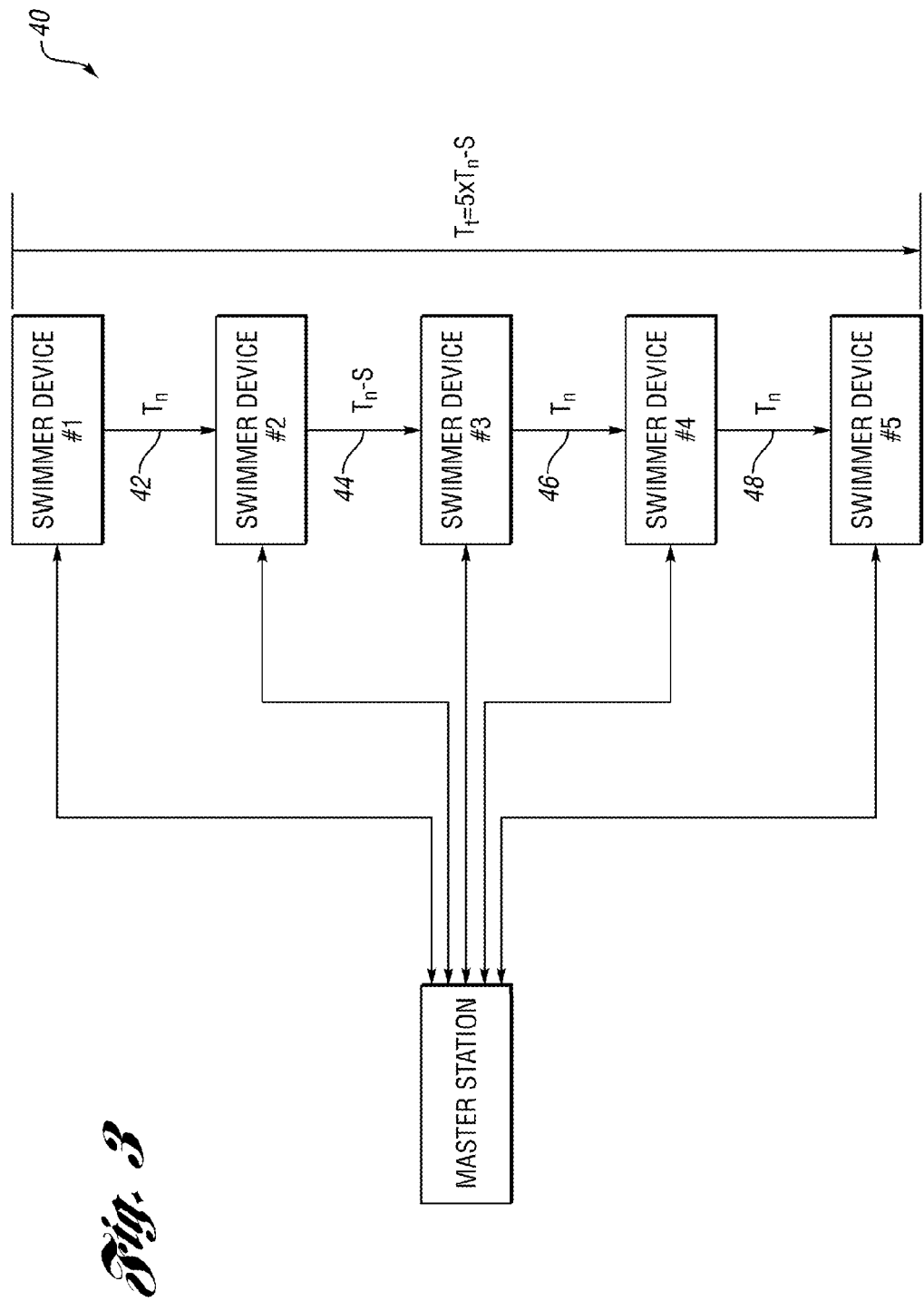
FIG. 3 illustrates a shortening of a transmission window as contemplated by one non-limiting aspect of the present invention.

FIG. 3 illustrates a shortening of a transmission window 44 in accordance with one non-limiting aspect of the present invention. The transmission window 44 may be shortened by a length of time (S) in the event the corresponding swimmer device (SD #2) fails to acknowledge the polling request sent from the master station 24. The failure to acknowledge the polling request may occur if the swimmer device fails to transmit data to the master station 24 within a period of time after the master station 24 issues the corresponding polling request, which period of time may be referred to as a presence period. The swimmer device may fail to respond to the polling request in the event the swimmer device fails to receive the corresponding polling request, such as if the swimmer device is below a water surface of the swimming pool where it is unable to receive or at least sufficiently receive wireless signals or during other conditions where the swimmer device is otherwise beyond a transmission range or capability of the corresponding master station.

The length of time (S) by which the transmission window 44 is shortened may correspond with a length of time slightly longer than a length of time typically required for the swimmer device to receive the polling request and to begin transmitting data in response thereto. This length of time (S) may, of course, be variable and contingent upon the capabilities of the swimmer device and/or operating/transmission conditions in which the swimmer device is operating. The ability to shorten the transmission window 44 may be beneficial in speeding the rate at which the next swimmer device (SD #3) is provided with its polling request and corresponding opportunity to transmit performance-metric data to the master station 24. In the event a large number of swimmer devices are being polled, a significant time savings can be provided if multiple transmission windows are shortened in this manner as it will allow the master station 24 to move more quickly through the schedule.

The shortening of the transmission window 44 may optionally be implemented by the master station 24 without having to communicate with the master station controller 26. In other words, the master station 24 may automatically move to the next swimmer device (SD #3) upon expiration of the presence period without having to request permission from the master station controller 26 or otherwise notify the master station controller 26 prior to issuing the corresponding polling request to the next swimmer device. In some cases, it may take 30 ms or longer for the master station 24 to send and receive a message from the master station controller 26, which is time saved by the present invention enabling the master station 24 to automatically move onto the next swimmer device without requesting permission from the master station controller 26. The present invention, of course, is not necessarily so limited and fully contemplates the master station 24 requesting the master station controller 26 to move on to the next swimmer device before transmitting the corresponding polling request to the next swimmer device.

Optionally, the shortening of the transmission window may occur if the swimmer device completely transmits its desired amount of performance-metric data prior to the nominal transmission window ($T_n$) elapsed. The master station 24 may determine a cessation in signaling from the swimmer device after the swimmer device has begun transmitting the performance-metric data, and assume from this cessation, that the swimmer device no longer desires to transmit additional information. The master station 24 may also determine all desired performance-metric data to have been transmitted from the swimmer device based upon other messaging transmitted the swimmer device. For example, a message format or protocol of the signaling used to carry the performance-metric data from the swimmer device to the master station 24 may include one or more fields for identifying an amount of data requiring transmission from swimmer device. This information can be used by the master station 24 and/or the master station controller 26 to identify completion of the data transfer.

Table 1 illustrates an exemplary response of a swimmer device to a polling request. The response may be referred to as an event response and may include a plurality of fields to facilitate transmitting the performance-metric data and other data to the master station 24 and/or the master station controller 26. The data comprising the performance-metric data may be included in bytes 9 through 9+(7N−1) and the data comprising the non-performance-metric data may be included in the other bytes, as specified in Table 1 with more detail. Optionally, the amount of processing the master station 24 is required to execute based on the data included in the event response may be limited in order to speed the rate at which the event responses can be provided to the master station controller 26 for analysis into the performance results. The ability to configure the master station 24 to minimize the amount of time it spends processing the event response also allows the master station 24 to beginning polling the next swimmer device more quickly, leading to further increases in the speed at which information is provided to the master station controller.

The master station 24 may be configured to look at or otherwise process a selected one or more of the bytes carried within the event response in order to ameliorate processing time. The master station 24 may achieve this, for example, by ignoring all bytes other than a byte used to identify whether any other additional events (performance-metric data) need to be sent from the swimmer device, i.e., byte 4. By ignoring the other bytes beside byte 4, the master station 24 acts essentially as a pass-through or relay to the master station controller 26 as the event responses is carried through to the master station controller 26 with little processing and delay by the master station 24. The processing performed by the master station 24 of byte 4 may include assessing whether the corresponding value is zero or greater than zero.

A byte 4 value greater than zero may be used to indicate the need to transmit additional events (i.e., performance-metric data) and a value equal to zero may be used to indicate no further need to transmit additional events. The master station 24 may automatically begin polling the next swimmer device upon detecting the byte value equal to zero in order to facilitate speeding the polling process. The master station may also automatically grant the current swimmer device additional transmission time in the event the byte 4 for is greater than zero. The amount of additional time granted to the currently transmitting swimmer device may be lengthened in a manner described below in more detail, such as by increasing a duration of the current transmission window and/or by granting the swimmer device another transmission window (which may be the same, greater than, or shorter than the last transmission window, optionally depending on the amount of event responses desired to be sent).

TABLE 1

| Producer | Swimmer Device |
| Purpose | Event Response |
| Length | Variable based on number of events contained (0-15) |
| Consumers | Master Station |
| Report Rate | Reply to Event Poll |

| Byte | Contents | Description | Range/order |
|---|---|---|---|
| 0 | Message ID | 5 - Event Response | 1-255 |
| 1 | HD Serial Num | This is a 3 bytes value | LSB |
| 2 | | encoded into the EEPROM | middle byte |
| 3 | | during manufacturing | MSB |
| 4 | Events to Send | The number of events not yet | LSB |
| 5 | | sent (NOT including the events in this message) | MSB |
| 6.0 | Coach Audio Received | Acknowledge that coach audio image was received | 0 or 1 |
| 6.1 | Coach Audio Played | Acknowledge that coach audio image was played | 0 or 1 |
| 6.2 | Parametric Data Received | Acknowledge that parametric data was received | 0 or 1 |
| 6.3 | Disable Fast Data | Tells MS to disable fast data collection retry feature | 0 or 1 |
| 6.4 | Last Group of Diagnostic Data | Indication that this is the last group of non-event data | 0 or 1 |
| 6.5 | Contains Raw Data | Indication that the data after this byte is raw data | 0 or 1 |
| 6.6 | Contains Audio RSSI Data | Indication that the data after this byte is audio RSSI data | 0 or 1 |
| 6.7 | Low Battery Indication | | 0 or 1 |
| 7 | Audio Image Number | The Audio Image number played and/or received. | LSB |
| 8 | | | MSB |
| 9 | Event 1 Data | 2 byte value indicating the | LSB |
| 10 | | sequence number of the event (one based) | MSB |
| 11.3-11.0 | | Event Type | 0-15 |
| 12.7-11.4 | | Event Amplitude | 0-4095 |
| 13 | | 3 byte value indicating the | LSB |
| 14 | | number of milliseconds since | middle byte |
| 15 | | the last 4 hour period that the event occurred. | MSB |
| 16-22 | Event 2 Data | | |
| ... | ... | ... | ... |
| ... | ... | ... | ... |
| ... | ... | ... | ... |
| ... | Event N Data | N must be less than or equal to 15 | |
| 9 + 7N | SD RSSI | RSSI Seen by SD | −128-127 |
| 10 + 7N | MS RSSI | RSSI Seen by MS | −128-127 |
| 11 + 7N | Checksum/LQI | bit 7 = Checksum Valid, bit 6-0 = LQI | |

Table 1 is but one of a number of possible mechanisms by which the master station 24 may be configured to facilitate executing the polling process contemplated by the present invention, and particularly, without having to communicate with the master station controller 26 in order to gain approval for proceeding to the next swimmer device and/or for staying on the same swimmer device for additional period of time. Other mechanisms may be used to facilitate a similar type of control without deviating from the scope in contemplation of the present invention, such as by the swimmer devices transmitting separate messages over the same or different channels and/or embedding other information in the signaling transmitted to the master station, e.g., by including a separate message preceding the transmission of the event response message illustrated in table 1. Optionally, in the event the master station 24 detects the byte 4 to be equal to zero, the master station 24 may be configured to effectively shorten the current transmission window by automatically proceeding to poll the next swimmer device prior to awaiting expiration of the current transmission window.

In addition to or in place of shortening a transmission window, the present invention contemplates speeding the rate at which the master station 24 is able to move through the schedule by allowing the master station 24 to skip one or more of the swimmer devices. The master station, for example, may entirely skip the second swimmer device (SD #2) and instead proceed directly from the first swimmer device (SD #1) to one of the other swimmer devices, e.g., swimmer device (SD #4). The one or more skipped swimmer devices may be selected by the master station 24 and/or the master station controller 26 depending on a swimming stroke or other activity being performed by the user wearing the device. The performance-metric data collected by the corresponding one or more of the skipped swimmer devices, for example, may be correlated to a period of time during which the swimmer device is likely to be underwater or otherwise unavailable to receive the polling request and/or to formulate a suitable reply (e.g. event response) to the polling request.

The master station controller 26 and/or the master station 24 may rely on this assumption of the swimmer device being unavailable for use in identifying that swimmer device as a candidate to be skipped. This information may be used to generate a skipped interval for one or more swimmer devices, i.e., an indication of a period in time during which the corresponding swimmer device likely to be unavailable to facilitate transmission of the performance-metric data to the master station 24. The skipped interval may be correlated with the polling schedule to identify conditions in which the polling interval for a particular swimmer device overlaps with that device's skipped interval. These overlapping intervals may be used to indicate conditions during which it may be desirable to skip the corresponding swimmer device. The master station 24 and/or the master station controller 26 may be configured to continually monitor these two parameters in order to ensure a swimmer device is not inadvertently skipped due to an adjustment in the schedule.

The performance-metric data may be analyzed by the master station controller 26 to assess the likelihood of the swimmer engaging in a stroke at a certain period of time during which the polled swimmer devices is likely to be unavailable, i.e., the swimmer device engaging in one of a freestyle (crawl) stroke, a backstroke, or breaststroke and is likely to be underwater at the schedule polling interval if the swimmer continues the current swimming pattern. (United States patent application no. 2011/0153042 details one process contemplated by the present invention by which the swimming stroke may be determined and used in this manner to identify periods of unavailability.) Additionally, the performance-metric data may be analyzed to assess a position of the swimmer within the pool, or elsewhere, to identify conditions reflective of the corresponding positioning preventing the swimmer device from completing a polling request, i.e., the device may be underwater or otherwise beyond the range of the master station and unable to receive the polling instructions from the master station and/or unable to respond to receive polling request (e.g., such as in the event the swimming device receives the polling instructions just prior to heading under water surface).

Figure 4:
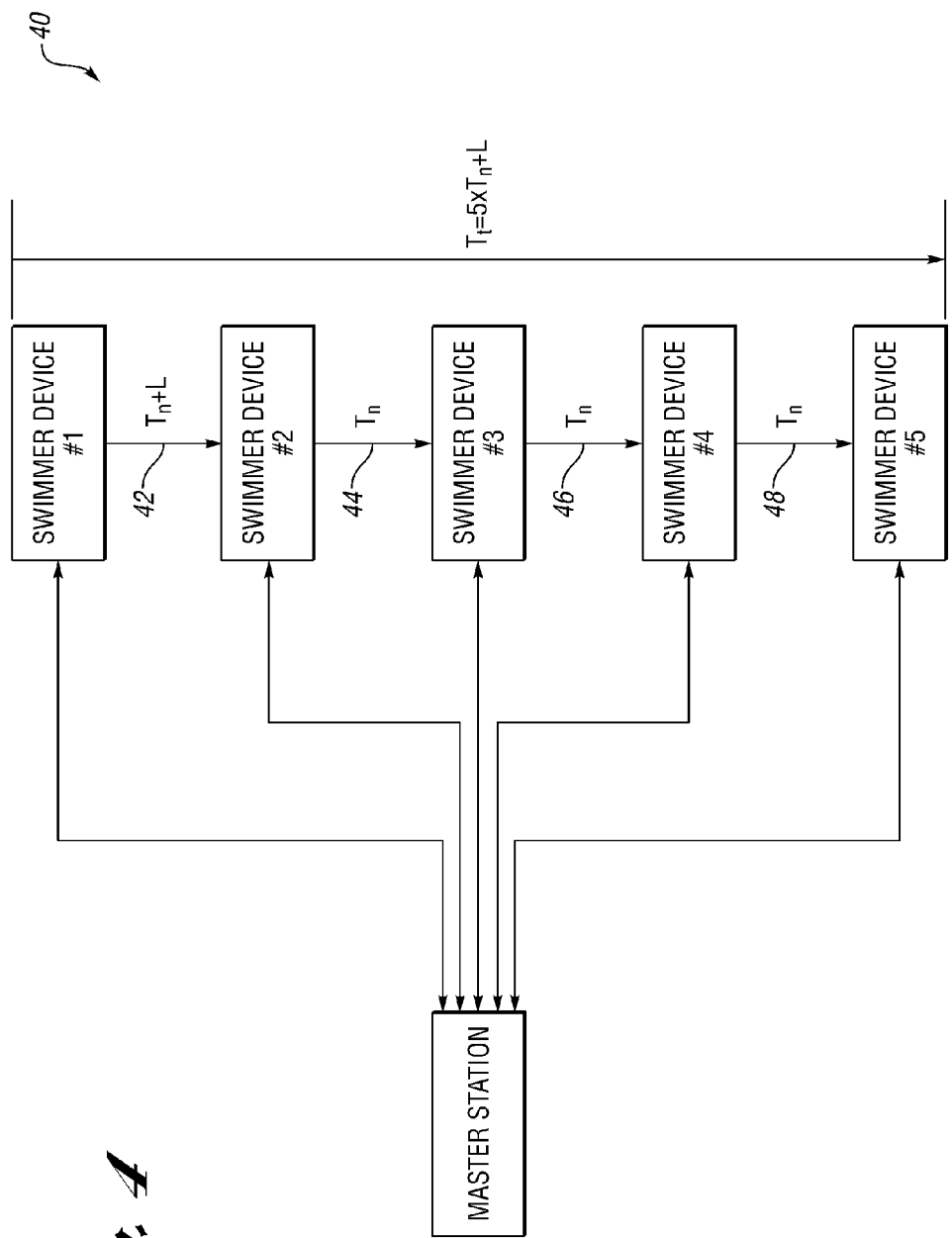
FIG. 4 illustrates a lengthening of a transmission window as contemplated by one non-limiting aspect of the present invention.

FIG. 4 illustrates a lengthening of a transmission window 42 in accordance with one non-limiting aspect of the present invention. The lengthening of the transmission window 42 may correspond with one of the plurality of transmission intervals provided to the swimmer device #1, such as at a beginning of a polling operation of the master station and/or and some point after the master station has polled the other swimmer devices. The lengthening may operate in cooperation with the shortening process described above in order to facilitate collecting information from swimmer devices that may have been underwater or otherwise unable to communicate event responses to the master station 24 during the immediately preceding transmission window assigned to it and/or at some other prior period of time. This can be particularly beneficial in the event the swimmer devices have limited storage capabilities and are unable to sufficiently store the performance-metric data for prolonged period of time, which can be problematic if the swimmer devices are required to storage large amounts of data due to the device being underwater for greater periods of time or coincidentally being unavailable during scheduled transmission windows.

The desired lengthening of the transmission window may occur by adding an additional period of time (L) in order to provide the swimmer device with more time to transmit performance-metric data to the master station 24. The lengthening of the transmission window 42, assuming that the other transmission windows maintain the nominal ($T_n$), results in a corresponding lengthening of a total time ($T_t$) taken to poll through each of the swimmer devices increasing by the corresponding period of time (L). This lengthening may be temporarily implemented for the current polling cycle such that upon return to the same swimmer device during next polling cycle the corresponding transmission window of that swimmer device is returned to the nominal duration ($T_n$). The amount of lengthening provided by the lengthening. (L) may be variable such that the lengthening may be tailored to the particular needs of the transmitting swimmer device. Optionally, the master station 24 may be configured to determine the amount of lengthening without having to issue a corresponding request to the master station controller 26, thereby eliminating the need in delay associated with the attendant signaling.

The amount of performance-metric data desired to be transmitted from the swimmer device may be one variable useful in determining the lengthening (L) needed to achieve the desired transmission. The amount of performance-metric data desired to be transmitted from the swimmer device may be determined, for example, from the byte 4 and/or through some other identification process triggered by the swimmer device. The master station 24 may review byte 4 in more detail during this lengthening process than during the shortening process, at least in that the master station 24 may assess the actual numerical value as opposed to whether the value is simply greater than or equal to zero. The particular numerical value may be used to estimate and/or particularly indicate the amount of additional data desired to be transmitted from the swimmer device. The master station 24 may perform a calculation based on this amount of data (numerical value) to estimate a sufficient lengthening (L) to facilitate transmission of that desired amount of data.

The swimming stroke or other movements being performed by the user wearing the swimmer device may also be one variable useful in determining the lengthening (L) needed to achieve the desired transmission. If it is known that the swimmer is performing an action where the swimmer device is likely to be able to continue transmitting to the master station without interruption, this information can be used to determine the amount of lengthening (L), e.g., the lengthening (L) may be selected to be a first value if it is known that the currently perform swimming stroke is likely to result in the swimmer device being underwater for a shorter period of time and a second, greater value if it is known that the currently perform swimming stroke is like to result in the swimmer being above the water for a longer period of time, i.e., when performing the crawl stroke and/or breaststroke the swimmer is likely to be above the water for longer period of time than when performing a backstroke.

The positioning of the swimmer device within the swimming pool may also be one variable useful in determining the lengthening (L) needed to achieve the desired transmission. If is known that the swimmer is approaching an end of the pool where the swimmer will likely be required to dive underwater in order to complete a turn by pushing off the wall of the swimming pool, the distance of the swimmer to the wall, optionally with cooperation of an estimated speed of the swimmer, to determine amount of time remaining before the swimming device is likely to become unavailable. This estimated period of time may be equal to the actual lengthening (L) or used as a basis for selecting the lengthening (L), i.e. a safety margin may be included such that the lengthening (L) is less than the time remaining (As noted above, the exemplary descriptions provided with respect to the sensor device being worn on a swimmer are provided to provide context to the present invention and are not intended to limit the present invention to swimming activities. The present invention fully contemplates assessing other movements and positions of the user relative to other boundaries and environments beside those associated with a swimmer and a swimming pool.)

Figure 5:
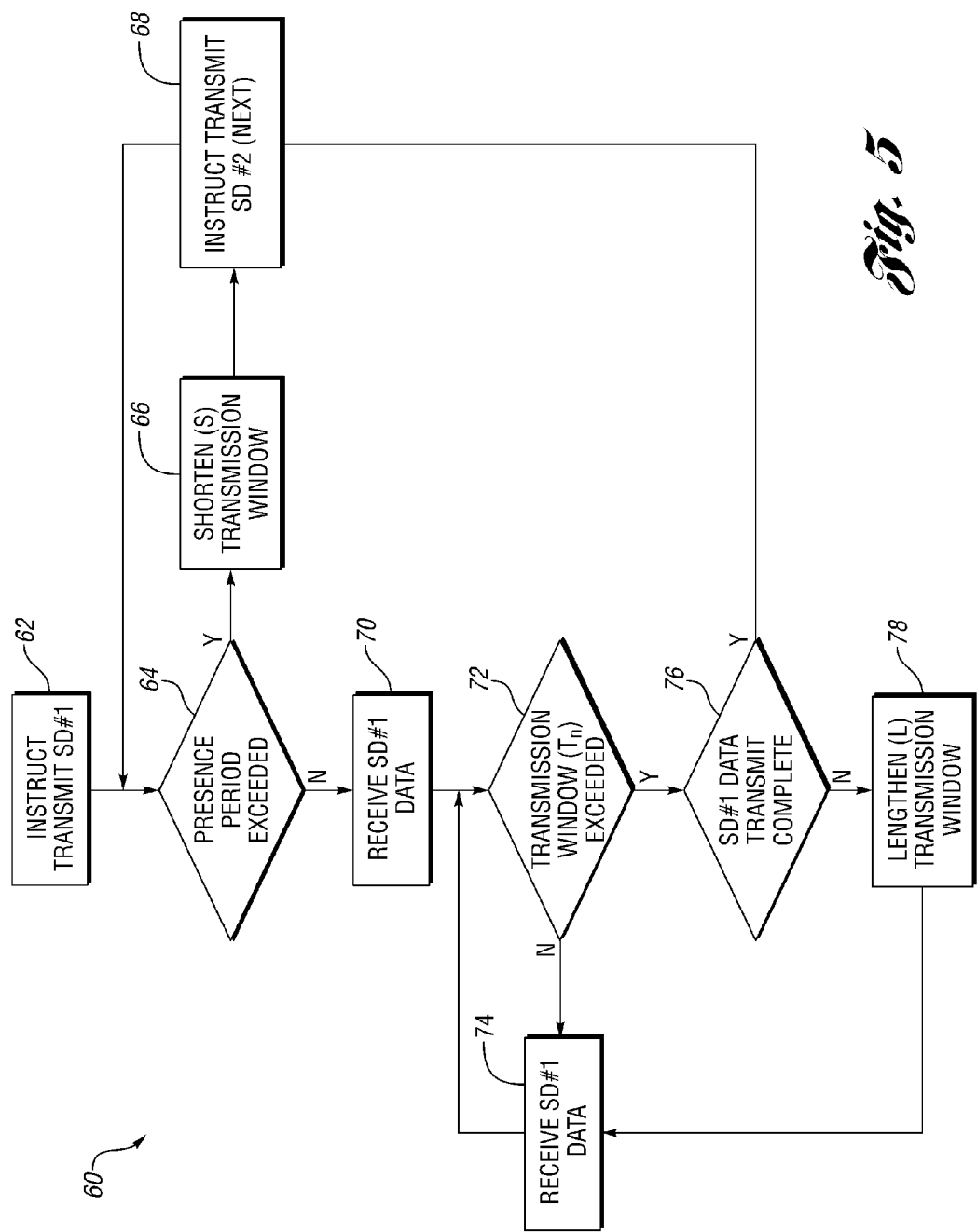
FIG. 5 illustrates a flowchart of a fast data method as contemplated by one non-limiting aspect of the present invention.

FIG. 5 illustrates a flowchart 60 of a fast data method as contemplated by one non-limiting aspect of the present invention. The fast data method relates to facilitating rapid processing of performance-metric data and/or other data transmitted in the event responses from the sensor devices 12 to the master station 24 for ultimate receipt by the master station controller 26 and processing into the performance results. As with the description provided above, the method is predominately described with respect to the sensor devices 12 being swimmer devices and actions being monitored correspond with those of the swimmer. This is done for exemplary non-limiting purposes as the present invention fully contemplates use application in other environments. The operations contemplated by the flowchart 60 may be implemented in cooperation with computer-readable instructions or other logically functioning elements operating in cooperation with one or more of the devices and/or features noted above. While some of the described operations are noted as being performed with a particular one of the devices noted above, this is done for exemplary purposes as the present invention fully contemplates one or more of the devices sharing or otherwise implementing the noted processes and other operations associated with achieving the results desired by the present invention.

Block 62 relates to a first swimming device (SD #11) being instructed to transmit performance-metric data and/or other data to the master station 24, such as with communication of a polling request from the master station 24. The timing of this polling request may be specified within a schedule provided from the master station controller 26 to the master station 24 specifying a corresponding transmission window for the first SD. Block 64 relates to assessing whether a presence period has been exceeded for the first SD. The presence period may relate to a period of time shorter than the transmission window in order to assess whether the first SD is available to transmit the performance-metric data. Block 66 relates to the first SD failing to begin transmission of the performance-metric data before expiration of the presence period and the master station effectively shortening the transmission windows assigned to the first SD. (As noted above, other processes may be relied upon by the master station to shorten the transmission window and/or to skip to the next SD). Block 68 relates to the master station then transmitting a new polling request to the next swimmer device (a second SD) during which the same process is repeated.

Block 70 relates to the first SD beginning to transmit the performance-metric data prior to expiration of the presence period. This may include the master station 24 receiving an event response or other message sufficient to facilitate transmission of the performance metric data from the first SD and relaying the received data to the master station controller 26 for processing. Block 72 relates to assessing whether the transmission window assigned to the first SD has been exceeded. Block 74 relates to there being additional time remaining in the transmission window and the master station 24 continuing to receive performance metric data from the first SD. (As noted above, the master station 24 may have to be configured to pass to the next SD prior to expiration of the transmission window in the event the data transmission is completed.)

Block 76 relates to assessing whether the first SD has completely transmitted its desired amount of performance-metric data to the master station 24. In the event the transmission is completed, Block 68 is returned to and the next SD is invited to transmit performance-metric data. Block 78 relates to lengthening the transmission window for the first swimmer device in the event the desired amount of data is not completely transmitted. The transmission window may be lengthened by a period of time (L) sufficient to facilitate additional data transmission, such as in a manner described above. Optionally, rather than lengthening the transmission window by a period of time (L), the window may be lengthened based on an amount of data desired for further transmission from the first SD such that the closing of the transmission may be based on amount of data yet to be received from the first SD as opposed to an elapsed amount of time.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of facilitating fast data processing at a master station controller of swimming data collected with swimmer devices worn on a plurality of swimmers swimming, the method comprising:

enabling the master station controller to instruct the swimmer devices when to transmit the swimming data over one or more wireless channels for receipt and processing by the master station controller, including instructing the swimmer devices to transmit swimming data during transmission windows assigned such that no more than one of the swimmer devices attempts to transmit swimming data over the same one of the one or more wireless channels at the same time;

enabling the master station controller to instruct a first swimmer device of the swimmer devices attempting to transmit over the same channel to transmit swimming data during a first transmission window, at least a portion of the first transmission window occurring while this first swimmer device is submersed below a water surface such that the first swimmer device is unable to completely transmit a first set of swimming data collected prior to the first transmission window, the first transmission window having a duration equal to a first length;

enabling the master station controller to instruct the first swimmer device to transmit swimming data during a second transmission window, the second transmission window occurring after the first transmission window while the first swimmer device is above the water surface, the first swimmer device desiring to transmit any non-transmitted portion of the first set of swimming data and a second set of swimming data collected after the first transmission window during the second transmission window, the second transmission window having a duration equal to the first length;

in the event the first swimmer device is unable to completely transmit any non-transmitted portion of the first and second sets of swimming data during the second transmission window, enabling the master station controller to instruct the first swimmer device to transmit at least any non-transmitted portion of the first and second sets of swimming data during a third transmission window immediately following the second transmission window, the third transmission window having a duration equal to a second length, the second length being greater than the first length; and shortening a fourth transmission window for the first swimmer device to transmit a third set of swimming data from the first length to a third length in the event the first swimmer device fails to begin transmitting the third set of swimming data within a first amount of time occurring after a beginning of the fourth transmission window, the third set of swimming data being at least partially collected by the first swimmer device prior to the first transmission window.

2. The method of claim 1 further comprising selecting the second length based on a swimming stroke being performed by a swimmer wearing the first swimmer device.

3. The method of claim 2 further comprising selecting the second length based on amount of time the swimming stroke results in the first swimmer device being above the water surface.

4. The method of claim 2 further comprising selecting the second length to be a first amount in the event the swimming stroke is a crawl stroke and to be a second amount in the event the swimming stroke is a backstroke, the second amount being greater than the first amount.

5. The method of claim 1 further comprising selecting the second length based on a position of a swimmer wearing the first swimmer device within a swimming pool.

6. The method of claim 5 further comprising selecting the second length to be a first amount in the event the swimmer is a first distance away from an end of the swimming pool and to be a second amount in the event the swimmer is a second distance away from the end of the swimming pool, the second distance being greater than the first distance and the first amount being less than the second amount.

7. The method of claim 1 further comprising configuring a master station for use in instructing the first swimmer device when to transmit the swimming data, the swimming data being received by the master station and then transmitted to the master station controller for processing into performance results.

8. The method of claim 1 further comprising, in the event the first swimmer device is unable to complete transmission of the first and second sets of swimming data during one or both of the second and third transmission windows, enabling the master station controller to instruct the first swimmer device to transmit any non-transmitted portion of the first and second sets of swimming data during a fourth transmission window, the fourth transmission window having a third length that is greater than the second length.

9. A non-transitory computer-readable medium having a plurality of non-transitory instructions operable with a controller to facilitate fast data processing of performance-metric data collected by swimmer devices worn on a plurality of swimmers while swimming, the swimmer devices being configured to wirelessly transmit the performance-metric data to the controller, the non-transitory instructions being sufficient for:

instructing the swimmer devices when to transmit the performance-metric data during assigned transmission windows;

instructing a first swimmer device of the swimmer devices to transmit a first set of performance-metric data during a first transmission window, at least a portion of the first transmission window occurring while this first swimmer device is submersed below a water surface such that the first swimmer device is unable to completely transmit the first set of performance-metric data;

instructing the first swimmer device to transmit a second set of performance-metric data during a second transmission window, the second transmission window occurring after the first transmission window while the first swimmer device is above the water surface, the first swimmer device desiring to transmit any non-transmitted portion of the first set of performance-metric data and the second set of performance-metric data during the second transmission window;

in the event the first swimmer device is unable to completely transmit any non-transmitted portion of the first and second sets of performance-metric data during the second transmission window, instructing the first swimmer device to transmit at least any non-transmitted portion of the first and second sets of performance-metric data during a third transmission window immediately following the second transmission window; and instructing the first swimmer device to transmit a third set of performance- metric data during a fourth transmission window, and thereafter shortening the fourth transmission window when the first swimmer device fails to begin transmitting the third set of performance-metric data within a first amount of time occurring after a beginning of the fourth transmission window.

10. The non-transitory computer-readable medium of claim 9 further comprising non-transitory instructions sufficient for selecting the duration of the third transmission window depending on a swimming stroke being performed by the swimmer wearing the first swimmer device.

11. The non-transitory computer-readable medium of claim 10 further comprising non-transitory instructions sufficient for setting a duration of the third transmission window to a first length when the swimming stroke is a crawl and to a second length when the swimming stroke is a backstroke, the first length being shorter than the second length.

12. The non-transitory computer-readable medium of claim 10 further comprising non-transitory instruction sufficient for selecting the duration of the third transmission window depending on a position in a pool of the swimmer wearing the first swimmer device.

13. The non-transitory computer-readable medium of claim 12 further comprising non-transitory instruction sufficient for selecting the duration of the third transmission window to be a first length when the swimmer is beyond a first distance to an end of the pool and to be a second length when the swimmer is within the first distance, the second length being shorter than the first length.

14. A non-transitory computer-readable medium having a plurality of non-transitory instructions operable with a controller to facilitate fast data processing of performance-metric data collected by swimmer devices worn on a plurality of swimmers while swimming, the swimmer devices being configured to wirelessly transmit the performance-metric data to the controller, the non-transitory instructions being sufficient for:

instructing the swimmer devices when to transmit the performance-metric data during assigned transmission windows;

instructing a first swimmer device of the swimmer devices to transmit a first set of performance-metric data during a first transmission window, the first transmission window beginning while this first swimmer device is submersed below a water surface; and skipping the first transmission window assigned to the submerged first swimmer device, and thereafter, instructing the first swimmer device to transmit a second set of performance-metric data during a second transmission window, the second transmission window occurring after the first transmission window while the first swimmer device is above the water surface, the first swimmer device desiring to transmit any non-transmitted portion of the first set of performance-metric data and the second set of performance-metric data during the second transmission window; and in the event the first swimmer device is unable to completely transmit any non-transmitted portion of the first and second sets of performance-metric data during the second transmission window, instructing the first swimmer device to transmit at least any non-transmitted portion of the first and second sets of performance-metric data during a third transmission window immediately following the second transmission window.

15. The non-transitory computer-readable medium of claim 14 further comprising non-transitory instructions sufficient for instructing the first swimmer device to transmit a third set of performance-metric data during a fourth transmission window, and thereafter shortening the fourth transmission window when the first swimmer device fails to begin transmitting the third set of performance-metric data within a first amount of time occurring after a beginning of the fourth transmission window.

16. The non-transitory computer-readable medium of claim 14 further comprising non-transitory instructions sufficient for selecting a duration of the first transmission window depending on a swimming stroke being performed by the swimmer wearing the first swimmer device.

17. The non-transitory computer-readable medium of claim 16 further comprising non-transitory instructions sufficient for setting the duration of the first transmission window to a first length when the swimming stroke is a crawl and to a second length when the swimming stroke is a backstroke, the first length being shorter than the second length.

18. The non-transitory computer-readable medium of claim 14 further comprising non-transitory instruction sufficient for selecting a duration of the first transmission window depending on a position in a pool of the swimmer wearing the first swimmer device.

19. The non-transitory computer-readable medium of claim 18 further comprising non-transitory instruction sufficient for selecting the duration of the first transmission window to be a first length when the swimmer is beyond a first distance to an end of the pool and to be a second length when the swimmer is within the first distance, the second length being shorter than the first length.

20. The non-transitory computer-readable medium of claim 14 further comprising non-transitory instructions sufficient for initially scheduling the swimmer devices to transmit the performance-metric data during transmission windows arranged in a round-robin loop.

* * * * *